US011113040B2

(12) United States Patent
Baldwin et al.

(10) Patent No.: US 11,113,040 B2
(45) Date of Patent: Sep. 7, 2021

(54) SYSTEMS AND METHODS FOR ORCHESTRATION AND AUTOMATED INPUT HANDLING OF INTERACTIONS RECEIVED VIA A USER INTERFACE

(71) Applicant: Verizon Patent and Licensing Inc., Arlington, VA (US)

(72) Inventors: Christopher Michael Baldwin, Sewell, NJ (US); Dawn C. Morris, Jersey City, NJ (US); Snehal Neil Shah, Summit, NJ (US); Aditi Surana, Jersey City, NJ (US); Eric Winkle, Livingston, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 123 days.

(21) Appl. No.: 16/039,290

(22) Filed: Jul. 18, 2018

(65) Prior Publication Data
US 2020/0026501 A1  Jan. 23, 2020

(51) Int. Cl.
*G06F 8/38* (2018.01)
*G06F 3/0486* (2013.01)
*G06F 3/16* (2006.01)
*G06F 9/451* (2018.01)
*H04L 29/08* (2006.01)

(52) U.S. Cl.
CPC .............. *G06F 8/38* (2013.01); *G06F 3/0486* (2013.01); *G06F 3/167* (2013.01); *G06F 9/451* (2018.02); *H04L 67/306* (2013.01)

(58) Field of Classification Search
CPC ....................................................... G06F 8/38
See application file for complete search history.

(56) References Cited

U.S. PATENT DOCUMENTS

| | | | |
|---|---|---|---|
| 8,756,118 B1* | 6/2014 | Bernshteyn | G06Q 30/0633 705/26.1 |
| 9,489,119 B1* | 11/2016 | Smith, Jr. | G06F 40/117 |
| 9,893,959 B1* | 2/2018 | Duet | H04L 67/10 |
| 10,248,912 B1* | 4/2019 | Robinson | G06Q 10/02 705/5 |
| 10,489,044 B2* | 11/2019 | Cummins | G06F 16/162 |
| 2005/0216118 A1* | 9/2005 | Conard | B07C 3/00 700/223 |
| 2014/0075344 A1* | 3/2014 | Bentrup | G06F 11/323 715/760 |
| 2015/0264025 A1* | 9/2015 | Kurtzeborn | G06F 16/972 726/4 |
| 2016/0378437 A1* | 12/2016 | Patino-Bueno | G06F 8/36 717/105 |
| 2017/0032136 A1* | 2/2017 | Gangadharappa | G06F 21/6227 |
| 2018/0225265 A1* | 8/2018 | Fitzpatrick | G06F 17/214 |
| 2018/0232817 A1* | 8/2018 | Isaacson | G06F 16/951 |
| 2018/0335907 A1* | 11/2018 | Mohan | G06F 30/00 |
| 2019/0004773 A1* | 1/2019 | Hoberman | G06F 3/04847 |

(Continued)

*Primary Examiner* — Abdullah Al Kawsar
*Assistant Examiner* — Samuel Shen

(57) ABSTRACT

A system described herein may provide a mechanism for decoupling user interfaces from backend input processing systems by receiving user input that was provided to a user interface, identifying a label (e.g., a label that was defined as being associated with an interactive element via which the user input was received) associated with the user input, and identifying one or more actions to perform based on the received label.

20 Claims, 10 Drawing Sheets

(56) References Cited

U.S. PATENT DOCUMENTS

2019/0050414 A1*  2/2019  Maturana ............. G05B 19/418
2019/0065153 A1*  2/2019  Olsson ...................... G06F 8/34
2020/0097145 A1*  3/2020  Pope ................ H04N 21/42204

* cited by examiner

400 ⤵

| Label(s) | Action(s) |
|---|---|
| A | Obtain user name and address from user profile repository.<br>Validate user input against obtained address.<br>If address invalid, request correction. If address valid, forward user name, address, and input to Input Handling System 255-1. |
| B | Extract first three characters of user input.<br>Forward extracted characters to Input Handling System 255-2.<br>Forward entire user input to Input Handling System 255-3. |
| C or D | Provide user input to Input Handling System 255-2. |
| E and (A or B) | Obtain subscription status from user profile repository.<br>If subscription active, forward user input to Input Handling System 255-1.<br>If subscription inactive, forward user input to Input Handling System 255-2. |
| None | If input includes text, validate address and forward input to Handling System 255-2. If input does not include address, forward input to Handling System 255-1. If input does not include text, forward to Handling System 255-3. |

FIG. 4

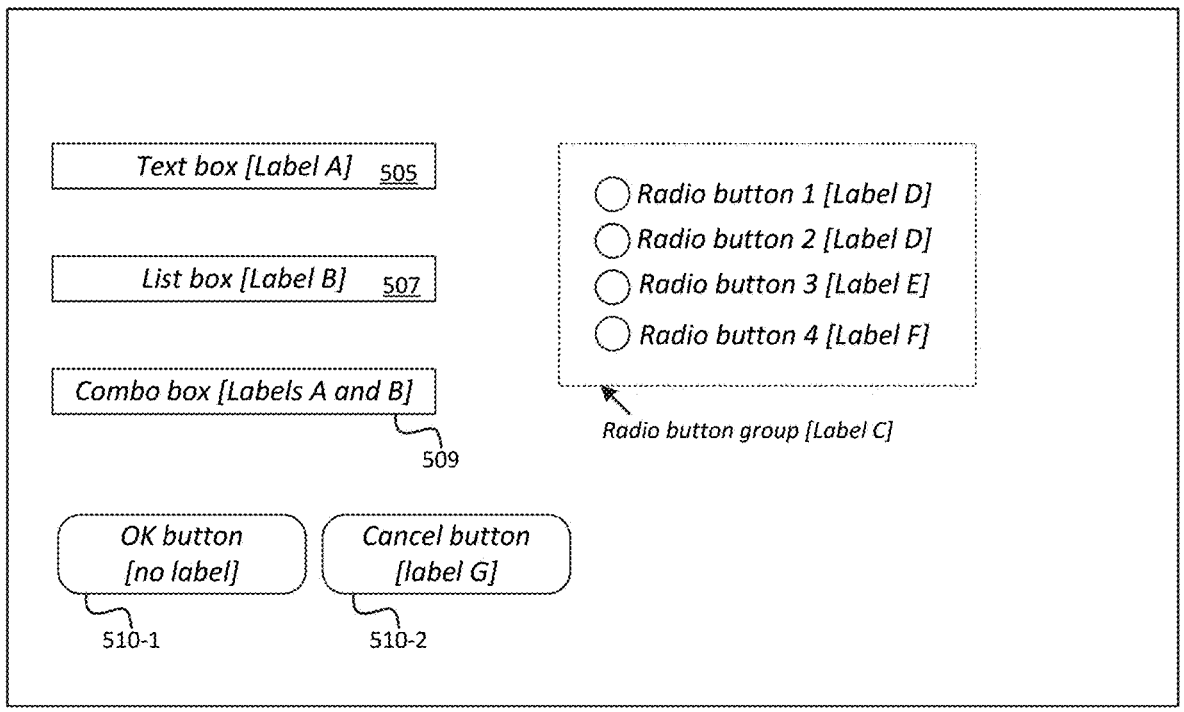

FIG. 5

SYSTEMS AND METHODS FOR ORCHESTRATION AND AUTOMATED INPUT HANDLING OF INTERACTIONS RECEIVED VIA A USER INTERFACE

BACKGROUND

Service providers, such as wireless telecommunications network providers, Internet service providers ("ISPs"), and/or other types of entities (e.g., companies, institutions, or other types of entities) may offer end-user support solutions (e.g., sales support, technical support, etc.). The support may be offered via purpose-built user interfaces that interact with purpose-built backends, which may be specifically designed for the type of support offered. For example, a sales support user interface and backend may be built by one development team that develops a sales support system for a sales support division of a given entity, while a technical support user interface and backend may be built by another development team that develops the technical support system for a technical support division of the same entity.

BRIEF DESCRIPTION OF THE DRAWINGS

FIG. 4 illustrates an example data structure that may be used by an orchestration system in some embodiments;

FIG. 5 conceptually illustrates an example graphical user interface ("GUI") that can be provided to a user and through which user inputs can be received in conjunction with labels;

DETAILED DESCRIPTION OF THE PREFERRED EMBODIMENTS

The following detailed description refers to the accompanying drawings. The same reference numbers in different drawings may identify the same or similar elements.

Service providers may offer systems with which users may interact, including automated systems such as web-based GUIs, GUIs presented in an application running on a device (sometimes referred to as an "app"), voice-based systems such as interactive voice response ("IVR") systems, or the like. The systems are often purpose-built, in that a particular system may be geared toward one type of interaction (e.g., customer service interactions, technical support interactions, sales interactions, etc.). Communicating between different systems may be difficult or costly, in that different systems may have different communication pathways, messaging protocols, or may present other technical hurdles that prevent the systems from communicating.

As described herein, some embodiments may provide an orchestration system that allows front-end (e.g., user-facing) components (e.g., GUIs, IVR systems, and/or other user interfaces) to be decoupled from back-end components (e.g., systems that process user input, modify configurations or settings based on user input, reply to user input, etc.). Decoupling front-end components from back-end components may provide more flexibility in designing and deploying different solutions, including allowing for back-end components that are developed by different teams, companies, and/or other entities, to be accessed via an easily designed and/or modified user interface. This may alleviate or eliminate challenges faced in modifying, designing, or deploying user interface systems that communicate with multiple different distinct back-end components.

Figure 1:
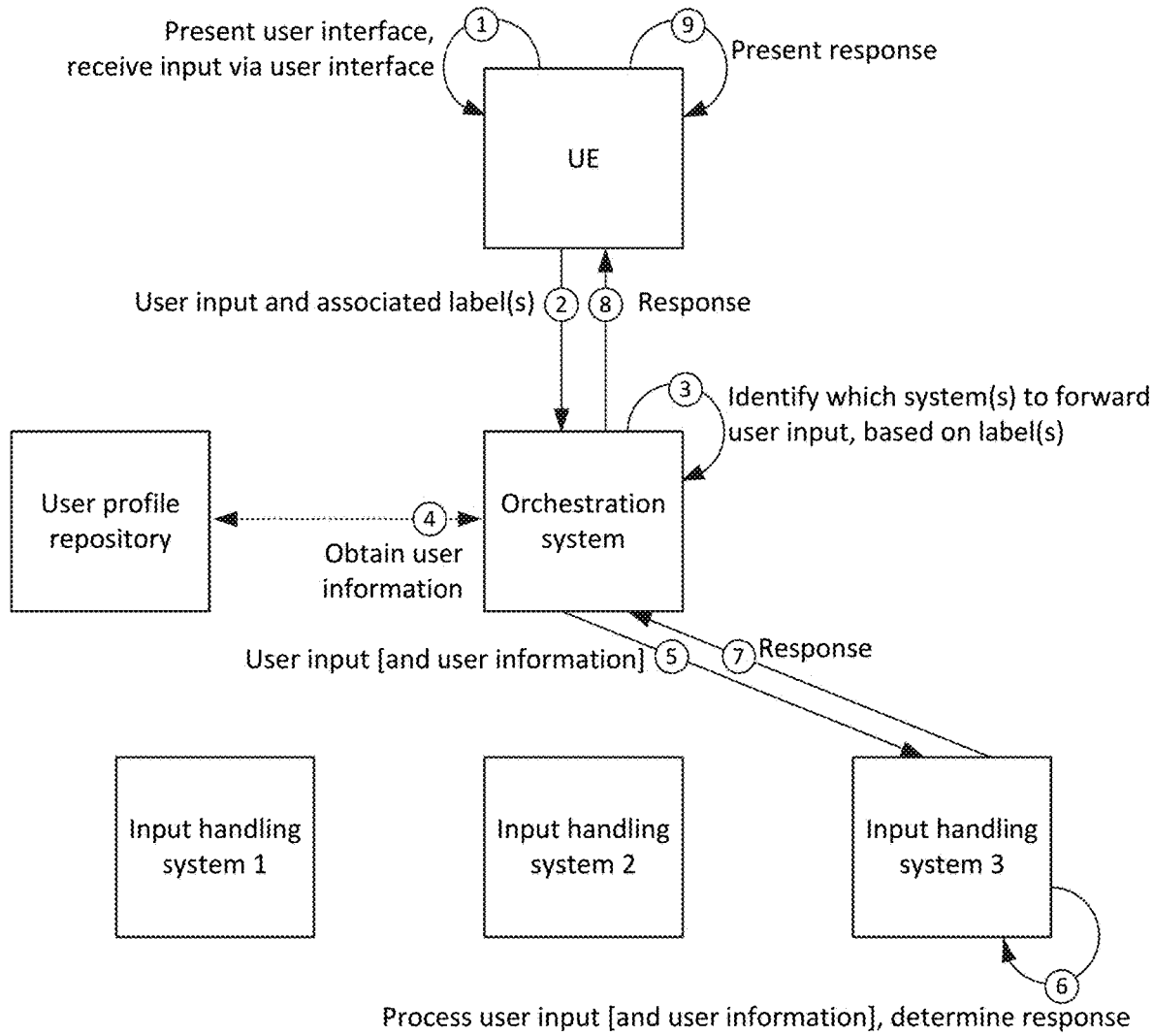
FIG. 1 illustrates an example overview of one or more embodiments described herein, in which an orchestration system handles user input received via a user interface.

For example, as shown in FIG. 1, a user equipment ("UE"), such as a mobile telephone, a desktop computer, a laptop computer, etc. may present (at 1) a user interface. As discussed below, the user interface may have been designed to have interactive elements, such as text boxes, list boxes, buttons, or the like. As also discussed below, each interactive element may be associated with one or more labels, which may be used by an orchestration system to determine how to handle input received via the interactive element. As shown, an input may be received via the user interface (e.g., a click of a button, a text entry, etc.).

The UE may forward (at 2) the user input, as well as the label(s) associated with the interactive element(s) via which the input was received. For example, assume that the received input is text inputted via a text box. Further assume that the text box is associated with a particular label. The UE may forward the text, as well as the particular label, to the orchestration system.

The orchestration system may identify (at 3) what, if any, actions to perform on the received input. For example, the orchestration system may identify which input handling system(s) to forward some or all of the input to. As further shown, in some embodiments, the orchestration system may obtain (at 4) user information from a user profile repository. For example, the orchestration system may have received (e.g., prior to, or concurrently with the user input received at 1) information identifying the UE or a user of the UE. The orchestration system may use this identifying information to query the user profile repository for the user information (e.g., a user name, address, subscription information, etc.). In some embodiments, the orchestration may omit obtaining user information from the user profile repository.

The orchestration system may output (at 5) some or all of the user input, as well as some or all of the obtained user information, to the selected input handling system. In the example shown in FIG. 1, input handling system 3 has been selected (at 3) out of a set of three candidate input handling systems. Input handling system 3 may process (at 6) the user input (and the user information obtained from the user profile repository, if applicable). For example, input handling system 3 may modify a subscription of the user, modify a configuration of an Internet of Things ("IoT") device associated with a user, look up information requested by the user, and/or perform some other task based on the user input. In some embodiments, input handling system may determine a response for the user, such as a confirmation that the input was received and acted upon, and/or an answer to a question included in the input.

Input handling system 3 may output (at 7) the response to the orchestration system, which may forward (at 8) the response to the UE. In some embodiments, the response from input handling system 3 may include one or more labels, and the orchestration system may handle the response (e.g., forward to a different input handling system, in addition to or in lieu of forwarding the response to the UE).

Figure 2:
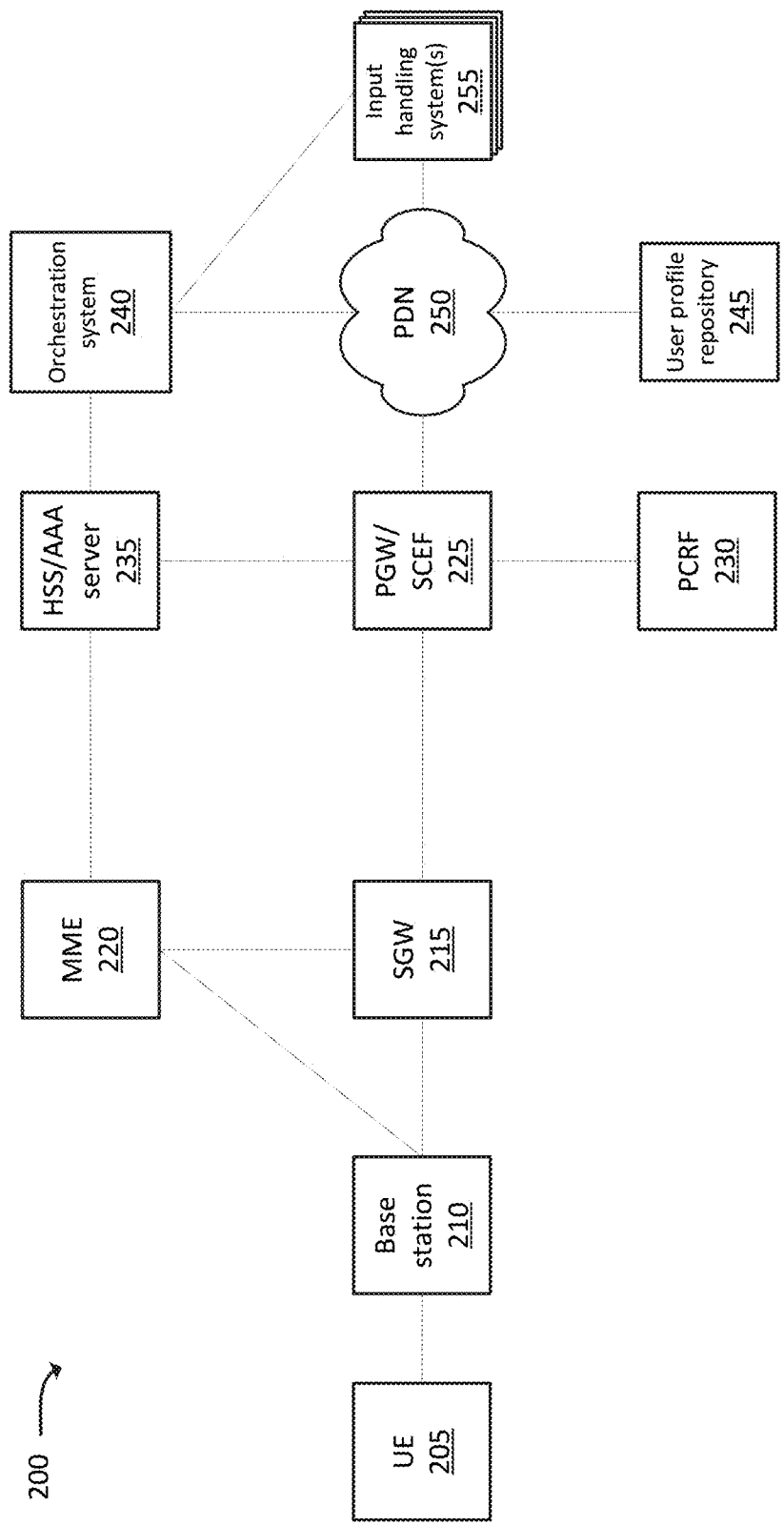
FIGS. 2 and 3 illustrate example environments in which one or more embodiments, described herein, may be implemented.

FIG. 2 illustrates example environment 200, in which systems and/or methods described herein may be implemented. As shown in FIG. 2, environment 200 may include UE 205, base station 210, Serving Gateway ("SGW") 215, Mobility Management Entity ("MME") 220, PDN gateway ("PGW") and/or Service Capability Exposure Function ("SCEF") 225 (referred to herein as "PGW/SCEF 225"), policy and charging rules function ("PCRF") 230, home subscriber server ("HSS")/authentication, authorization, accounting ("AAA") server 235 (hereinafter referred to as "HSS/AAA server 235"), orchestration system 240, user profile repository 245, PDN 250, and one or more input handling systems 255 (sometimes referred to hereinafter individually as "input handling system 255" or as "input handling system 255-1," "input handling system 255-2," etc., or collectively as input handling systems 255).

While "direct" connections are shown in FIG. 2 between certain devices, some devices may communicate with each other via one or more intermediary devices (e.g., routers, switch, hubs, etc.) or networks (e.g., an Ethernet backhaul network ("EBH") and/or some other type of network). Furthermore, some of the connections shown in FIG. 2 may be logical connections, and may represent the communication between different logical portions of a single device. Further, in some implementations, some devices, shown in FIG. 2, may communicate with each other even though connections are not shown between such devices in the figure.

Environment 200 may include an evolved packet system ("EPS") that includes a Third Generation Partnership Project ("3GPP") radio access network ("RAN") and/or an Evolved Packet Core ("EPC") network that is operated based on a 3GPP wireless communication standard. The RAN may be, or may include, a Long-Term Evolution ("LTE") network, a fifth generation ("5G") RAN, etc., that each include one or base stations 210 (which may take the form of evolved NodeBs ("eNBs")), via which UE 205 may communicate with the EPC network. The EPC network may include one or more SGWs 215, PGW/SCEFs 225, and/or MMEs 220, and may enable UE 205 to communicate with PDN 250 and/or an Internet protocol ("IP") multimedia subsystem ("IMS") core network (not shown). The IMS core network may include and/or communicate with HSS/AAA server 235, and may manage authentication, session initiation, account information, a user profile, etc., associated with UE 205.

UE 205 may include a computation and communication device, such as a wireless mobile communication device that is capable of communicating with base station 210 and/or PDN 250. UE 205 may be, or may include, a radiotelephone; a personal communications system ("PCS") terminal (e.g., a device that combines a cellular radiotelephone with data processing and data communications capabilities); a personal digital assistant ("PDA") (e.g., a device that may include a radiotelephone, a pager, Internet/intranet access, etc.); a smart phone; a laptop computer; a tablet computer; a camera; a personal gaming system; an IoT device (e.g., a sensor, a smart home appliance, or the like); an M2M device; or another type of mobile computation and communication device. UE 205 may send traffic to and/or receive traffic from PDN 250 via base station 210, SGW 215, and/or PGW/SCEF 225.

Base station 210 may each include one or more network devices that receive, process, and/or transmit traffic, such as calls, audio, video, text, and/or other data, destined for and/or received from UE 205. In one example, base station 210 may be part of an LTE network, a 5G network, another advanced network, etc. Base station 210 may receive traffic, destined for UE 205, from SGW 215, PGW/SCEF 225, and/or PDN 250, and may output the traffic to UE 205. Base station 210 may also receive traffic from UE 205, and may output the traffic to its intended destination via SGW 215, PGW/SCEF 225, and/or PDN 250.

SGW 215 may include one or more network devices that gather, process, search, store, and/or provide information in a manner described herein. SGW 215 may, for example, aggregate traffic received from one or more base stations 210, and may send the aggregated traffic to PDN 250 via PGW/SCEF 225.

MME 220 may include one or more computation and communication devices that perform operations to register UE 205 with the EPS, to establish bearer channels associated with a session with UE 205, to hand off UE 205 from the EPS to another network, to hand off UE 205 from the other network to the EPS, and/or to perform other operations. MME 220 may perform policing operations on traffic destined for and/or received from UE 205.

PGW/SCEF 225 may include one or more network devices that gather, process, search, store, and/or provide information in a manner described herein. PGW/SCEF 225 may aggregate traffic received from one or more SGWs 215, etc. and may send the aggregated traffic to PDN 250. PGW/SCEF 225 may also, or alternatively, receive traffic from PDN 250 and may send the traffic toward UE 205 via base station 210 and/or SGW 215.

PCRF 230 may include one or more devices that aggregate information to and from the EPC network and/or other sources. PCRF 230 may receive information regarding policies and/or subscriptions from one or more sources, such as subscriber databases and/or from one or more users (such as, for example, an administrator associated with PCRF 230).

HSS/AAA server 235 may include one or more devices that manage, update, and/or store, in a memory associated with HSS/AAA server 235, profile information associated with a subscriber. HSS/AAA server 235 may perform authentication, authorization, and/or accounting operations associated with the subscriber and/or a communication session with UE 205.

Orchestration system 240 may include one or more devices that perform functionality described herein. For example, orchestration system 240 may handle input received from UE 205 and/or more input handling systems, and may communicate with UE 205 and/or input handling systems according to labels and/or other types of rules associated with the received input. In some embodiments, orchestration system 240 may communicate with HSS/AAA server 235 via an internal interface (e.g., a communication pathway within an internal network, that does not traverse the Internet or PDN 250) in order to obtain and/or update information stored by HSS/AAA server 235. In some embodiments, orchestration system 240 may communicate with one or more other devices or systems (e.g., user profile repository 245 and/or input handling system 255) via PDN 250.

User profile repository 245 may include one or more devices that receive, store, update, and/or provide information associated with one or more users. In some embodiments, user profile repository 245 may be an external device with respect to one or more devices shown in FIG. 2, in that one or more of the devices may communicate with user profile repository 245 via PDN 250. In some embodiments, user profile repository 245 may receive user profile information from UE 205, orchestration system 240, input handling system 255, and/or one or more other devices and/or systems. In some embodiments, user profile repository 245 may receive user profile information from HSS/AAA server 235.

PDN 250 may include one or more wired and/or wireless networks. For example, PDN 250 may include an IP-based PDN, a wide area network ("WAN") such as the Internet, a private enterprise network, and/or one or more other networks. UE 205 may connect, through PGW/SCEF 225, to data servers, application servers, other UEs 205, and/or to other servers or applications that are coupled to PDN 250. PDN 250 may be connected to one or more other networks, such as a public switched telephone network ("PSTN"), a public land mobile network ("PLMN"), and/or another network. PDN 250 may be connected to one or more devices, such as content providers, applications, web servers, and/or other devices, with which UE 205 may communicate.

Input handling system 255 may include one or more devices (e.g., a device and/or a collection of devices) that communicate with UE 205 and/or orchestration system 240. For example, input handling system 255 may be a system that processes user input, and determines how the input should be responded to. For example, input handling system 255 may be an e-commerce system that receives orders for products and/or services and fulfills the orders, a banking system that provides sensitive bank account information to users, a credit application system that handles and approves credit checks for users, a conversational interaction system that responds to conversational commands from users and/or translates conversational commands from users into instructions for other devices or systems, etc.

Figure 3:
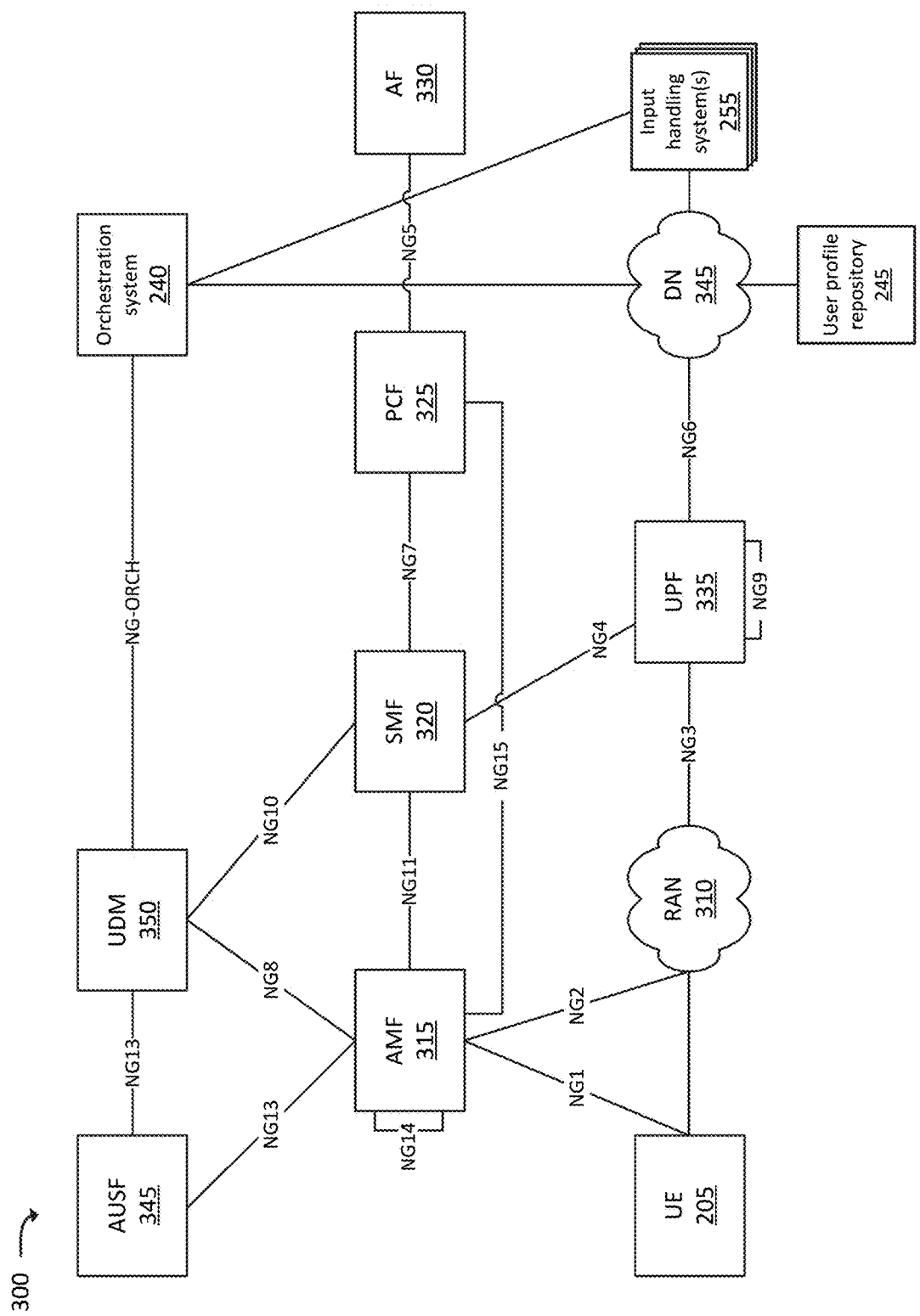

FIG. 3 illustrates another example environment 300, in which one or more embodiments may be implemented. Generally speaking, similar operations may be performed in environment 200 as in environment 300, in order to handle user input in accordance with embodiments described herein. Environment 300 may correspond to a 5G network, and/or may include elements of a 5G network.

As shown in FIG. 3, environment 300 may include UE 205, RAN 310, AMF 315, Session Management Function ("SMF") 320, Policy Control Function ("PCF") 325, Application Function ("AF") 330, User Plane Function ("UPF") 335, Data Network ("DN") 345, Authentication Server Function ("AUSF") 345, Unified Data Management ("UDM") 350, orchestration system 240, user profile repository 245, and input handling system 255.

The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

RAN 310 may be, or may include, a 5G RAN that includes one or more base stations, via which UE 205 may communicate with one or more other elements of environment 300. UE 205 may communicate with RAN 310 via an air interface. For instance, RAN 310 may receive traffic (e.g., voice call traffic, data traffic, messaging traffic, signaling traffic, etc.) from UE 305 via the air interface, and may communicate the traffic to UPF 335, and/or one or more other devices or networks. Similarly, RAN 310 may receive traffic intended for UE 305 (e.g., from UPF 335, and/or one or more other devices or networks) and may communicate the traffic to UE 305 via the air interface.

AMF 315 may include one or more computation and communication devices that perform operations to register UE 305 with the 5G network, to establish bearer channels associated with a session with UE 305, to hand off UE 305 from the 5G network to another network, to hand off UE 305 from the other network to the 5G network, and/or to perform other operations. In some embodiments, the 5G network may include multiple AMFs 315, which communicate with each other via the NG14 interface (denoted in FIG. 3 by the line marked "NG14" originating and terminating at AMF 315).

SMF 320 may include one or more network devices that gather, process, store, and/or provide information in a manner described herein. SMF 320 may, for example, facilitate in the establishment of communication sessions on behalf of UE 305. In some embodiments, the establishment of communications sessions may be performed in accordance with one or more policies provided by PCF 325.

PCF 325 may include one or more devices that aggregate information to and from the 5G network and/or other sources. PCF 325 may receive information regarding policies and/or subscriptions from one or more sources, such as subscriber databases and/or from one or more users (such as, for example, an administrator associated with PCF 325).

AF 330 may include one or more devices that receive, store, and/or provide information that may be used in determining parameters (e.g., quality of service parameters, charging parameters, or the like) for certain applications.

UPF 335 may include one or more devices that receive, store, and/or provide data (e.g., user plane data). For example, UPF 335 may receive user plane data (e.g., voice call traffic, data traffic, etc.), destined for UE 205, from DN 345, and may forward the user plane data toward UE 205 (e.g., via RAN 310, SMF 320, and/or one or more other devices). In some embodiments, multiple UPFs 335 may be deployed (e.g., in different geographical locations), and the delivery of content to UE 305 may be coordinated via the NG9 interface (e.g., as denoted in FIG. 3 by the line marked "NG9" originating and terminating at UPF 335). Similarly, UPF 335 may receive traffic from UE 205 (e.g., via RAN 310, SMF 320, and/or one or more other devices), and may forward the traffic toward DN 345. In some embodiments, UPF 335 may communicate (e.g., via the NG4 interface) with SMF 320, regarding user plane data processed by UPF 335. As mentioned above, this information may aid SMF 320 in monitoring (e.g., tracking, counting, etc.) the traffic for particular subscribers.

DN 345 may include one or more wired and/or wireless networks. For example, DN 345 may include an IP-based PDN, a WAN such as the Internet, a private enterprise network, and/or one or more other networks. UE 205 may communicate, through DN 345, with data servers, application servers 255, other UEs 205, and/or to other servers or applications that are coupled to DN 345. DN 345 may be connected to one or more other networks, such as a public switched telephone network ("PSTN"), a PLMN, and/or another network. DN 345 may be connected to one or more devices, such as content providers, applications, web servers, and/or other devices, with which UE 205 may communicate.

AUSF 345 and UDM 350 may include one or more devices that manage, update, and/or store, in one or more memory devices associated with AUSF 345 and/or UDM 350, profile information associated with a subscriber. AUSF 345 and/or UDM 350 may perform authentication, authorization, and/or accounting operations associated with the subscriber and/or a communication session with UE 305.

As similarly described above with respect to environment 200, orchestration system 240 may, in some embodiments, be an internal component with respect to one or more other devices and/or systems discussed with regard to environment 300. For example, orchestration system 240 may have a dedicated interface (shown as "NG-ORCH") between orchestration system 240 and UDM 350, so that orchestration system 240 can communicate with UDM 350 without traversing the Internet or DN 345.

FIG. 4 illustrates an example data structure 400 that may be used by an orchestration system in some embodiments. Specifically, for instance, the illustrated data structure 400 may conceptually represent information, stored by orchestration system 240, which associates (e.g., correlates and/or maps) labels to actions.

For instance, a first label (shown in the figure as Label "A") may be associated with a set of actions that indicate that, when user input is received in connection with Label A, a name and address of the user, from whom the input is received, should be obtained from a user profile repository (e.g., from HSS/AAA server 235, 350, and/or some other device and/or system). Additionally, the actions associated with Label A may include validating the received user input against the address obtained from the user profile repository. Further still, the actions associated with Label A may include logical operators, such as an if/then construct. For instance if the address is invalid (e.g., as determined by the comparison of validation of the received user input against the address obtained from the user profile repository), the actions associated with Label A may indicate that correction should be requested (e.g., orchestration system 240 should communicate with UE 205 to indicate that the user input was invalid, and/or to request a corrected address). On the other hand, if the address is valid the actions may indicate that the user name and address (e.g., as obtained from the user profile repository) should be forwarded to a particular device and/or system (e.g., to input handling system 255-1).

As further shown, another example label (Label "B") may indicate that when user input is received in connection with Label B, the first three characters of the user input should be extracted (e.g., assuming that the user input includes text), that the first three characters should be forwarded to one device and/or system (e.g., to input handling system 255-2), while the entire user input should be provided to another device and/or system (e.g., to input handling system 255-3).

In some embodiments, logical operators may be used to define which labels are associated with which actions. For instance, if input is received with either Label "C" or "D," data structure 400 may indicate that the user input should be provided to input handling system 255-2.

In some embodiments, labels may be used to define multiple sets of actions. For instance, while actions are shown above with respect to Labels A and B, these labels may be reused for another set of actions. As shown, if user input is received in connection with another label (e.g., Label "E") and either one of Label A or Label B (or both), then orchestration system 240 should obtain a status of a subscription, associated with a user or UE 205 from which the input was received, from a user profile repository. The actions associated with the conditional set of labels (i.e., "E and (A or B)") may further include conditional actions, such as forwarding the user input to input handling system 255-1 if the subscription is active, and forwarding the user input to input handling system 255-2 if the subscription is inactive.

As further shown, data structure 400 may store a set of default actions to perform when input is received without a label (or, in some embodiments, with an invalid/unrecognized label). As shown, if input received includes text, the associated actions indicate that orchestration system 240 should determine if the input includes text. If the input includes text, then orchestration system 240 should determine whether the text includes a valid address and, if so, forward the input to input handling system 255-2. If, on the other hand, the input does not include an address (but includes text), the input should be forwarded to input handling system 255-1. If the input does not include text (e.g., may include audio, video, an image, etc.), then the indicated action may include forwarding the input to input handling system 255-3.

As mentioned above, data structure 400 conceptually illustrates data stored by orchestration system 240. That is, while FIG. 4 shows actions in terms of human-readable sentences, in practice, orchestration system 240 may store computer code and/or may use some other technique to indicate actions that should be performed when a given label is received. The computer code may be, for instance, in the form of extensible markup language ("XML") code, Java code, C++ code, or the like. In some embodiments, the actions may be stored in the form of compiled executable code, or pointers to compiled executable code.

Additionally, while data structure 400 is illustrated as a 2-column table, data structure 400 may, in practice, be arranged, stored, or organized in some other arrangement. For instance, data structure 400 may include an array, a linked list, a tree, a hash table, and/or some other data structure. Additionally, in some embodiments, data structure 400 may be arranged in a hierarchical manner. For instance, assuming that input is received with Label A, orchestration system 240 may stop evaluating the input to determine whether any of the other conditions are met. In other embodiments, orchestration system 240 may continue evaluating the input. For example, when receiving input with Labels A and E, orchestration system 240 may execute the actions associated with both Label A, and with the expression "E and (A or B)." In some embodiments, individual labels may be associated with an "exit" (or similar command) which explicitly state that after the actions associated with the label (or conditional label(s)) are executed, no more labels (or conditional labels) should be evaluated. In these embodiments, in the absence of such an "exit" command, orchestration system 240 may continue evaluating labels, even if one label (or conditional label) is satisfied.

The information stored in data structure 400 may be received from, for example, a developer, designer, owner, operator, or the like, of a user interface that is provided to UE 205, of a particular input handling system 255, or of orchestration system 240. For example, as discussed below with regard to FIG. 6, the information may be based on interactions with a creation tool, which includes graphical interactive elements for creating a user interface that can be provided to UE 205.

FIG. 5 conceptually illustrates an example GUI 500 that can be provided to UE 205, and through which user inputs can be received in conjunction with labels. As shown, example GUI 500 may include graphical interactive elements, such as text box 505, list box 507, combo box 509, buttons 510-1 and 510-2 (hereinafter sometimes referred to individually as "button 510" or collectively as "buttons 510"), and a group of radio buttons.

As shown, text box 505, list box 507, combo box 509, buttons 510, and the radio buttons may each be associated with one or more labels. As further shown, the radio button group may itself be associated with a label. When input is received via a particular graphical interactive element, the input may be provided to orchestration system 240, along with any associated labels. For instance, when text is received via text box 505, the device that is presenting GUI 500 (e.g., UE 205) may provide the received text and the associated label (i.e., Label A in this example) to orchestration system 240. As another example, if a selection of a list item is made from list box 507, then that selection may be provided to orchestration system 240, along with associated Label B. In some embodiments, GUI 500 may be defined such that input received via one or more of the graphical interactive elements (e.g., boxes 505-509 or the radio buttons) may require input via another graphical interactive element before sending the input and associated label(s) to orchestration system 240. For instance, GUI 500 may be defined such that input received via list box 507 is provided to orchestration system 240 after OK Button 510-1 is selected. Additionally, or alternatively, GUI 500 may be defined such that input received via text box 505 is provided to orchestration system 240 independent of a selection of any of buttons 510. In some embodiments, the selection of one graphical interactive element may cause input received via some or all of the other graphical interactive elements of GUI 500 to be provided to orchestration system 240. For instance, selection of Cancel Button 510-2 may cause any or all input, received via boxes 505-509 and/or the radio buttons to be provided to orchestration system 240 (e.g., with their respective labels).

GUI 500 may be a conceptual representation, in that the actual display of GUI 500 on UE 205 may be different. For instance, the labels may not be visibly presented in GUI 500 when UE 205 displays GUI 500. Further, different or additional text may be presented in GUI 500 when UE 205 displays GUI 500. In some embodiments, GUI 500 may be a template, in that the labels and/or functional relationships between different elements may be defined by one entity (e.g., one developer or development team), while the content of GUI 500 (e.g., text, images, and/or other content to be displayed) may be defined by another entity. In this manner, GUI 500 may be dynamic and adaptable to different uses, without requiring the actual interactive elements or their relationships to be modified.

Further, while GUI 500 is discussed in the context of graphical interactive elements, other types of interactive elements may be used in addition to, or in lieu of, graphical interactive elements. For example, GUI 500 may include interactive elements that receive audio input (e.g., via a microphone of UE 205, image or video interactive elements (e.g., via a camera of UE 205), interactive elements that receive haptic input (e.g., via a touchscreen or touchpad of UE 205), interactive elements that receive input via a stylus of UE 205, and/or other types of interactive elements.

Figure 6:
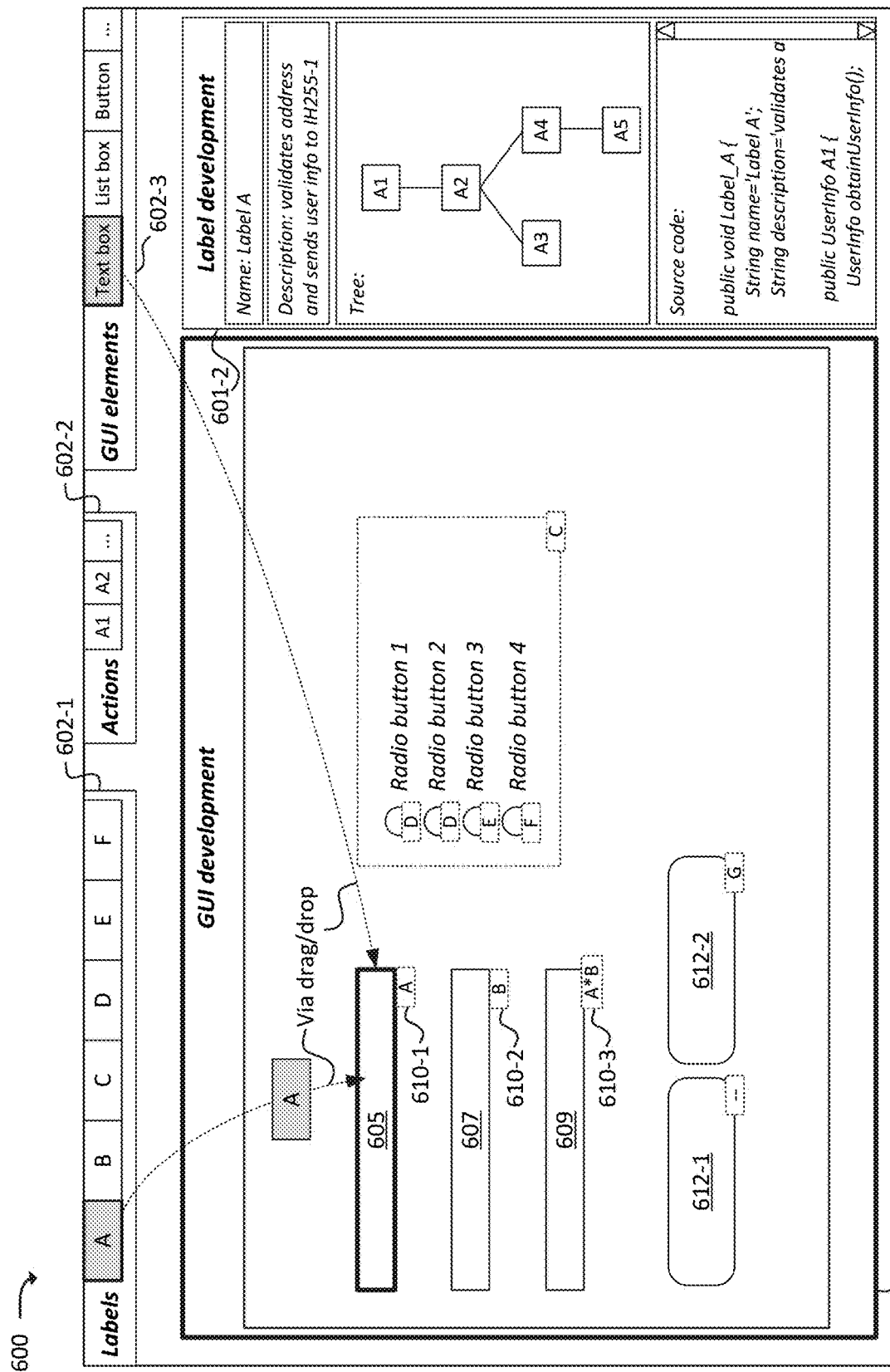
FIG. 6 illustrates an example development tool for developing the GUI shown in FIG. 5.

FIG. 6 illustrates an example development tool 600 for developing GUIs via which user input can be received along with associated labels, such as GUI 500 shown in FIG. 5. Development interface 600 may be executed by a device, such as a UE 205 associated with a developer, designer, or other entity that creates or defines GUI 500. As shown, development interface 600 may include multiple display areas 601, including GUI development area 601-1 and label development area 601-2. Development interface 600 may also include item bars 602, including label bar 602-1, action bar 602-2, and GUI element bar 602-3.

GUI development area 601-1 may be a display area for defining a GUI for use by, for example, a user of UE 205 (e.g., GUI 500). Interactive elements may be added to GUI 500 by, for instance, dragging and dropping items from bars 602 into GUI development area 601-1. As shown, for instance, text box 605 may be dragged and dropped from bar 602-3 onto the desired location in GUI development area 601-1. Other interactive elements, such as list box 607, combo box 609, and buttons 612-1 and 612-2 may have also been dragged and dropped onto GUI development area 601-1, as well as the radio buttons 1-4 and their associated radio button group.

Labels may also be added to the interactive elements in GUI development area 601-1. For example, as shown, Label A may be dragged from bar 602-1 onto text box 605, thus denoting that text box 605 is associated with Label A. Once Label A is added to text box 605, an indicator, such as indicator 610-1, may be presented in GUI development area 601-1. In some embodiments, indicator 610-1 may be a visible indicator. In some embodiments, indicator 610-1 may be hidden unless text box 605 is selected or hovered over by a mouse pointer, stylus, etc. (sometimes referred to as a "tooltip"). In some embodiments, indicator 610-1 may be displayed independent of whether text box 605 is selected or not.

As similarly shown, indicator 610-2 may be placed proximate to (e.g., overlaid upon) list box 607, to indicate that list box 607 is associated with Label B. In some embodiments, indicators 610 may be placed differently, in relation to their associated interactive elements, to denote labels associated with the interactive elements. For instance, indicator 610 may be partially overlaid on top of an associated interactive element, may be wholly overlaid on top of the associated interactive element, may be partially placed under the associated interactive element, or may be placed apart from the associated interactive element (e.g., within a threshold distance, but not overlapping).

Development interface 600 may also include label development area 601-1, which may be used to define labels (e.g., to define actions that should be performed when a given label is received by orchestration system 240 in conjunction with user input). Label development area 601-1 may display a name of the label and a description of the label. While not explicitly shown in FIG. 4, some or all of the information stored in data structure 400, for Label A, may be based on or derived from the information provided via label development area 601-1.

As shown, label development area 601-1 may include an area for graphically defining the action(s) to perform when Label A is received by orchestration system 240. In some embodiments, individual actions may be dragged and dropped from bar 602-2 to label development area 601-1. In this example, Label A may be defined as a tree, where actions are defined sequentially and/or hierarchically. For example, the displayed tree may indicate that Action A1 should be performed first, and then Action A2. Each action may have one or more expected input parameters, as well as one or more output parameters (e.g., may return variables or objects of a given type). Assume, for instance, that Action A2 has a binary output parameter (e.g., true or false, 1 or 0, yes or no, etc.). The split in the tree from Action A2 may indicate that if the output of Action A2 is one of the possible output parameters (e.g., true), then Action A3 should be performed. If on the other hand the output of Action A3 is another possible output parameter (e.g., false), then Action A4 should be performed, and then Action A5.

Referring again to FIG. 4, the actions shown in label development area 601-1, associated with Label A, may be the same as the ones described with respect to Label A in data structure 400. For example, Action A1 may include an instruction that causes orchestration system 240 to obtain a user name and address from a user profile repository, Action A2 may include an instruction that causes orchestration system 240 to validate the user input against the obtained address. Consistent with the discussion above, the validation may return true or false, which may lead to either Action A3 or A4 to be performed, and so on. While one potential format is shown for the actions associated with Label A, in some embodiments, the actions may be arranged differently than is shown in FIG. 6.

Label development area 601-1 may also include an area that displays source code (e.g., in a computer programming language such as Java, C++, etc.) associated with the label. In some embodiments, the source code may be directly editable by a user of development interface 600, and the graphical representation may automatically change based on the changes to the source code. Similarly, the source code may be automatically updated when the graphical representation of the label is changed.

Although not explicitly pictured, development interface 600 may include options to add logical operators (e.g., AND, OR, etc.) to labels (e.g., when adding to interactive elements, and/or when defining the actions of a label). For instance, such an option may have been used to define the label for combo box 609. That is, the "*" operator may denote a logical AND, and may be used to indicate that Labels A AND B are associated with combo box 609. Additionally, while dragging and dropping is described as an option for how labels and interactive elements of GUI development area 601-1 may be defined, in practice, other suitable techniques may be used. Providing tools for a user to graphically define a user interface, along with labels that can later be used to instruct orchestration system 240 on how to handle input received via the user interface, may allow the user to define/create the user interface without needing to manipulate computer code, thus making the interface creation process more accessible.

While GUI development area 601-1 and label development area 601-1 are shown in FIG. 6 as being displayed concurrently (e.g., in one application), in some embodiments, GUI development area 601-1 and label development area 601-1 may be distinct, unrelated display areas. In some embodiments, GUI development area 601-1 and label development area 601-1 may be used by different users (e.g., one entity who designs the user interface, and another interface who designs labels and their associated actions).

Figure 7:
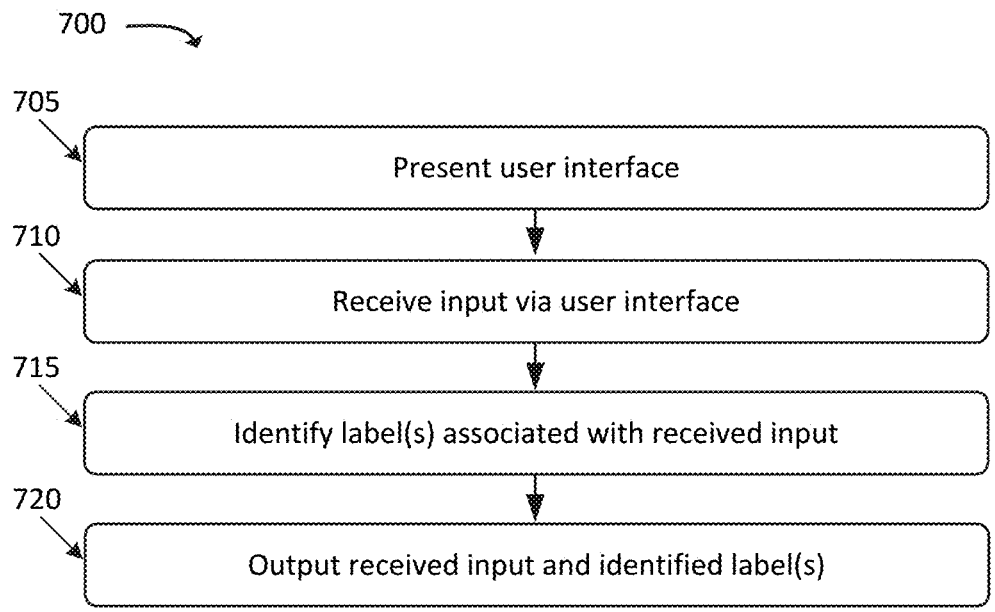
FIG. 7 illustrates an example process for forwarding user input, received via a GUI, to an orchestration system, in accordance with some embodiments.

FIG. 7 illustrates an example process 700 for forwarding user input, received via a GUI (e.g., GUI 500), to an orchestration system, in accordance with some embodiments. In some embodiments, some or all of process 700 may be performed by, for example, UE 205.

As shown, process 700 may include presenting (at 705) a user interface. For instance, UE 205 may present a user interface, such as GUI 500 and/or some other user interface that includes interactive elements and one or more labels associated with at least one of the interactive elements (e.g., a user interface created via development interface 600). UE 205 may present the user interface via, for example, a web browser (e.g., the user interface may be, or may be part of, a web page), an application (e.g., an "app), etc. In some embodiments, a user of UE 205 may have navigated to the user interface (e.g., navigated to a Uniform Resource Locator ("URL"), may have received a link to the user interface (e.g., via a text message or email), etc.

Process 700 may further include receiving (at 710) an input via the user interface. For instance, a user of UE 205 may click a button, enter text, make a selection in a menu, or the like.

Process 700 may further include identifying (at 715) one or more labels associated with the received input. For instance, as discussed, the input may be received via an interactive element that is associated with one or more labels. For instance, code associated the user interface (e.g., Hypertext Markup Language ("HTML") code, XML code, metadata, and/or some other code) may indicate the labels associated with the interactive elements, and UE 205 may identify the code that indicates the labels associated with the interactive elements. In some embodiments, UE 205 may not affirmatively identify the labels associated with the interactive elements. For example, the interactive elements may include parameters that are automatically provided to orchestration system 240 when the associated input is provided to orchestration system 240 (e.g., the label may be embedded into a name or identifier of the graphical element).

Process 700 may further include outputting (at 720) the received input, as well as the identified label(s). For example, UE 205 may output the input and labels to orchestration system 240. The intended destination (e.g., orchestration system 240) may be indicated by the interactive elements. For example, a particular interactive element may indicate that input received via the interactive element should be outputted to a given URL, where the URL is associated with orchestration system 240. As another example, an application executing on UE 205, which presents the user interface, may be configured to output user input and labels to orchestration system 240. In some embodiments, the destination of the input and labels may be dynamically changed. In this manner, a developer and/or other entity may be able to dynamically change the destination of the input received via the user interface, without changing the interface itself.

Figure 8:
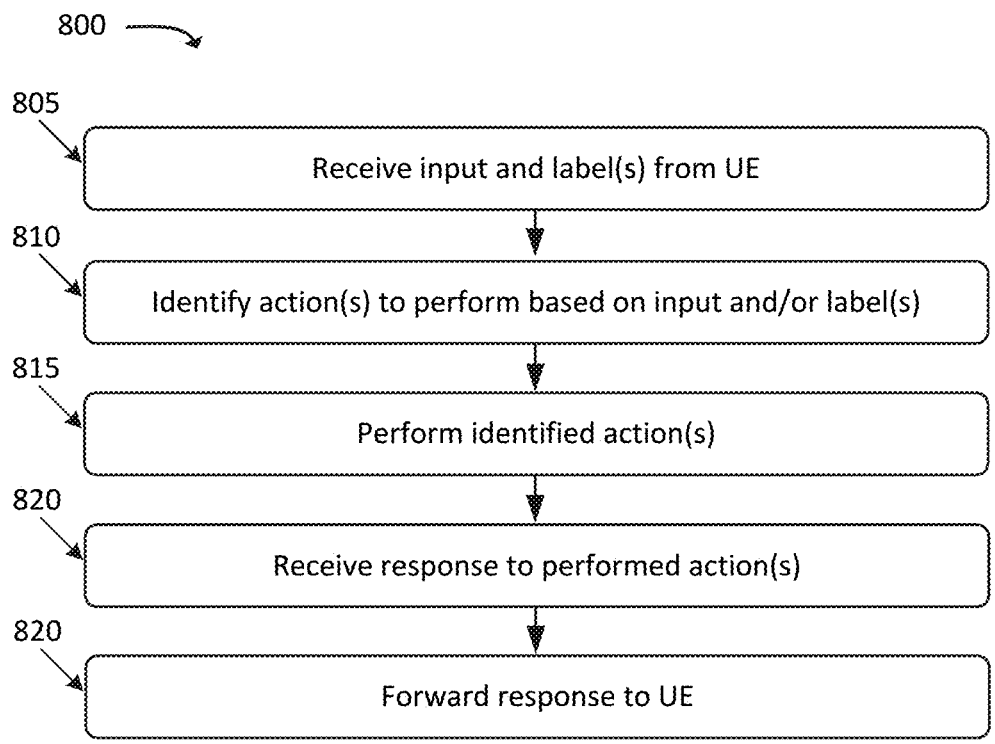
FIG. 8 illustrates an example process for handling user input, including selecting and forwarding the input to an appropriate input handling system.

FIG. 8 illustrates an example process 800 for handling user input, including selecting and forwarding the input to an appropriate input handling system. In some embodiments, some or all of process 800 may be performed by orchestration system 240.

Process 800 may include receiving (at 805) input and associated label(s) from UE 205. For example, the user input and labels discussed above with respect to process 700 may be received by orchestration system 240.

Process 800 may further include identifying (at 810) one or more actions to perform based on the received input and/or labels. For example, orchestration system 240 may compare the received label(s) to previously stored information that indicates how to handle input associated with certain labels (e.g., data structure 400, and/or other suitable information). As discussed above, identifying the actions may include evaluating conditions, such as whether the output of one action matches certain conditions and performing different subsequent actions based on the output of the action. As also discussed above, the actions may include selecting one or more input handling systems 255 and forwarding some or all of the received input to the selected input handling system(s) 255, obtaining information from a user information repository (e.g., HSS/AAA server 235, UDM 350, and/or another user information repository), validating input, requesting additional information from UE 205, and/or other actions. Process 800 may further include performing (at 815) the identified action(s).

Process 800 may additionally include receiving (at 820) a response to the performed action(s). For instance, the last action (if the received label(s) is/are associated with multiple actions) or the only action (if the received label(s) is/are associated with one single action) may have one or more outputs (e.g., text output, Boolean output, number output, and/or output of another type). In some embodiments, the response may include one or more other labels, based on which orchestration system 240 may perform one or more additional actions (e.g., return to block 815). In some embodiments, the response may indicate another user interface to present to UE 205 (e.g., a redirect to another web page, and/or some other user interface). In some embodiments, the user interface to be presented to UE 205 should be presented in addition to, or in lieu of, the user interface via which the user input was received (at 805). In some embodiments, the response may include some other type of instruction or request to provide to UE 205 (e.g., an instruction to play a sound, an instruction to display an image, an instruction to download a file, etc.).

Process 800 may also include forwarding (at 820) the response to UE 205. UE 205 may act on the response (e.g., follow an instruction, display information (e.g., a response to a question) in the user interface via which the input was received, display a new user interface, etc.).

Figure 9A:
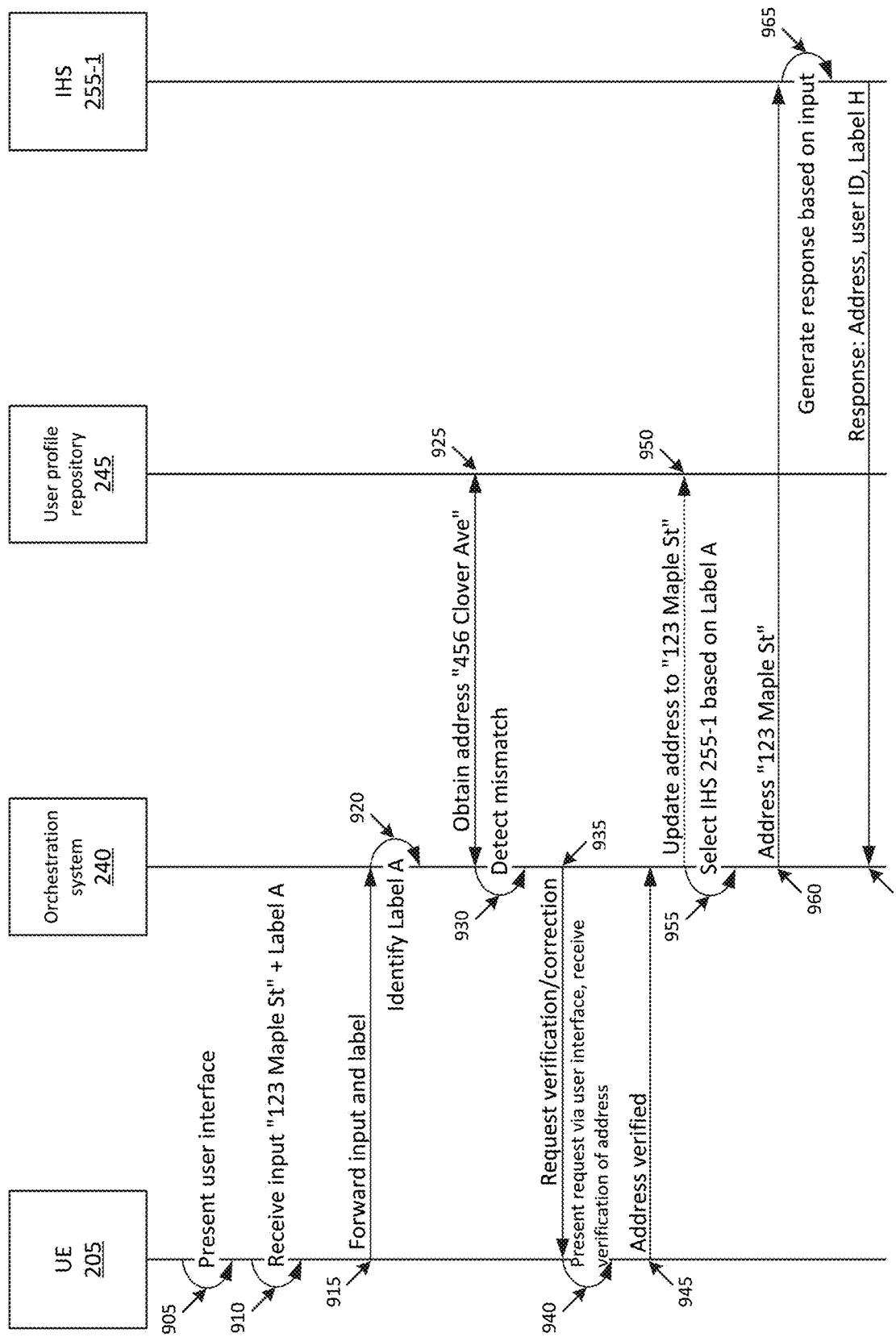
FIGS. 9A, 9B, and 10 conceptually illustrate example signal flows, according to one or more embodiments, in which user input is forwarded to an appropriate input handling system.
Figure 9B:
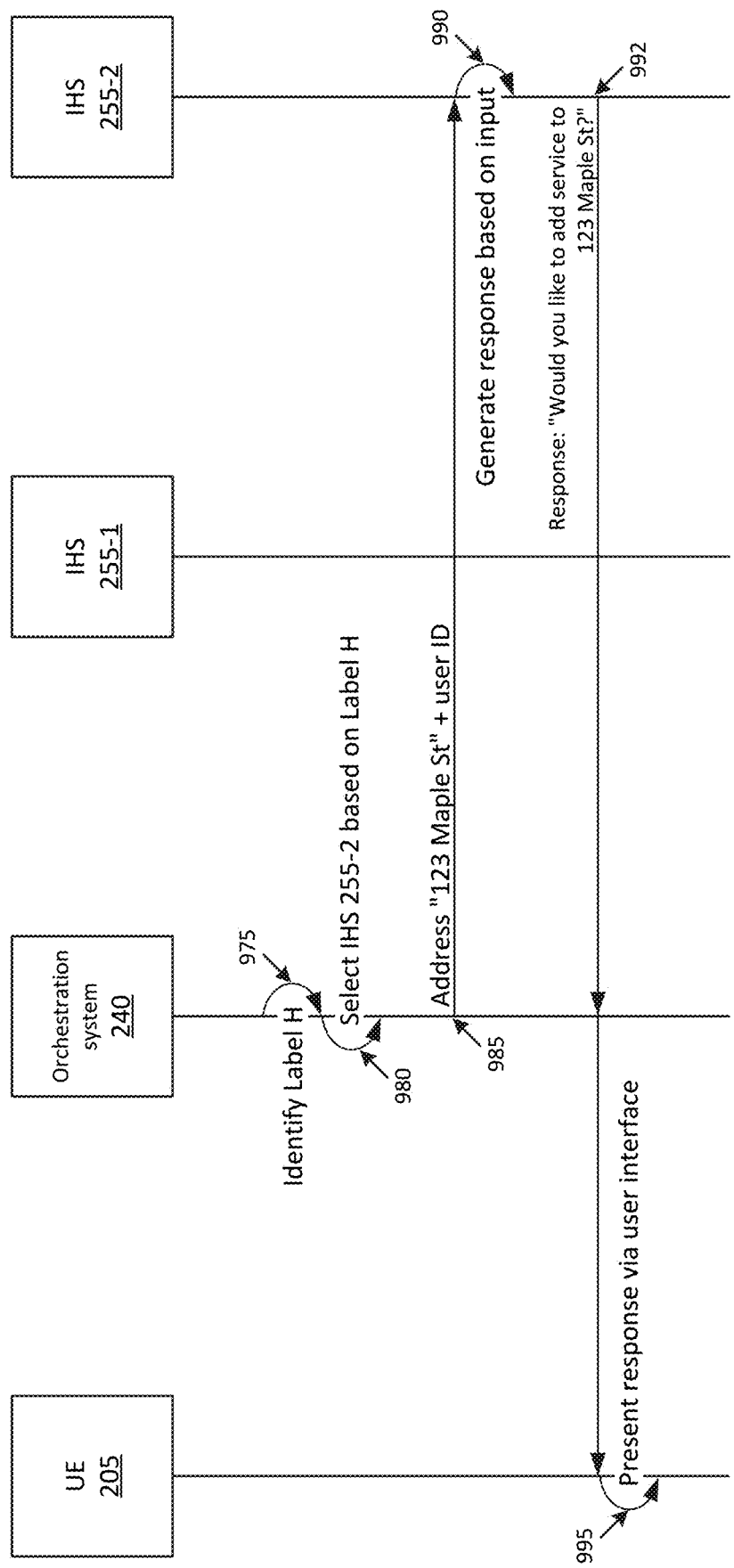

FIGS. 9A and 9B illustrate an example signal flow that corresponds to how user input may be handled by orchestration system 240. Some of the signals shown in FIG. 9A may be related to information stored in example data structure 400 shown in FIG. 4. Specifically, for instance, "Label A," referred to in FIG. 9A, may be associated with the same actions indicated as being associated with Label A in FIG. 4.

As shown in FIG. 9A, UE 205 may present (at 905) a user interface. The user interface may, in some embodiments, be a graphical user interface. In some embodiments, the user interface may additionally, or alternatively, include audible user interface elements (e.g., an IVR menu) and/or other types of user interface elements, as discussed above. UE 205 may receive (at 910) input via the presented user interface. For example, UE 205 may receive the input "123 Maple St" in a text field that is associated with Label A. UE 205 may forward (at 915) the received input and the label to orchestration system 240. Orchestration system 240 may identify (at 920) that Label A has been received, and may further identify actions associated with Label A.

For example, orchestration system 240 may identify that an address associated with UE 205 should be obtained (at 925) from user profile repository 245 (e.g., from HSS/AAA server 235, UDM 350, and/or some other device or system). As shown, the address "456 Clover Ave" may be received, and orchestration system 240 may detect (at 930) a mismatch between the addresses received from UE 205 and user profile repository 245. Based on detecting the mismatch, and further based on the actions associated with Label A, orchestration system 240 may request (at 935) correction of the address, and/or verification that the different address is correct. UE 205 may present (at 940) the request via the user interface, and may receive verification (e.g., via a user input) that the previously provided address (123 Maple St) is correct. UE 205 may notify (at 945) orchestration system 240 that the address has been verified by the user. In some embodiments, orchestration system 240 may notify (at 950) user profile repository 245 that the different address has been verified, and/or that user profile repository 245 should update its information to reflect the new address (e.g., in lieu of the old address, 456 Clover St). The notification (at 950) may be based on actions associated with Label A, although this particular action is not explicitly shown in FIG. 4 as being associated with Label A.

Orchestration system 240 may further select (at 955) input handling system 255-1 to receive the user input (e.g., the address 123 Maple St) based on actions associated with Label A. Referring to the example information shown in FIG. 4, the actions associated with Label A may indicate that the user input should be provided to input handling system 255-1 once validated. Orchestration system 240 may therefore provide (at 960) the user input (e.g., the address 123 Maple St) to input handling system 255-1. Input handling system 255-1 may process the input in any suitable manner, and may generate (at 965) a response. In this example, the response may include the address, an identifier ("ID") of the user, as well as another label (e.g., Label H in this example). The user ID may be determined by input handling system 255-1 based on information provided to input handling system 255-1 (e.g., in conjunction with the address provided at 960) and/or using some other technique to determine the user ID. Input handling system 255-1 may forward (at 970) the generated response to orchestration system 240.

FIG. 9B may be a continuation of the signals shown in FIG. 9A, and/or may occur based on some other signaling. As shown, orchestration system 240 may identify (at 975) that Label H was received, and may identify actions associated with Label H, which may include an action indicating that orchestration system 240 should forward a user ID and the previously received address to input handling system 255-2. Orchestration system 240 may thus may select (at 980) input handling system 255-2 based on identifying Label H. Orchestration system 240 may further forward (at 985) the address and user ID to input handling system 255-2, which may generate (at 990) a response based on the input. As one example, input handling system 255-2 may be a sales system that offers new service (e.g., Internet service, phone service, etc.) to users or locations that do not currently have service. Input handling system 255-2 may output (at 992) the response to orchestration system 240, which may forward the response to UE 205. In some embodiments, the response from input handling system 255-2 may include a label and/or some other instruction or information indicating that the response should be forwarded to UE 205. In some embodiments, the response may not include a label or explicit instruction to forward the response to UE 205; in such embodiments, orchestration system 240 may automatically (and/or by default) determine that the response is associated with a communication with UE 205, and may forward the response to UE 205 based on this determination. UE 205 may present (at 995) the response via a user interface.

Figure 10:
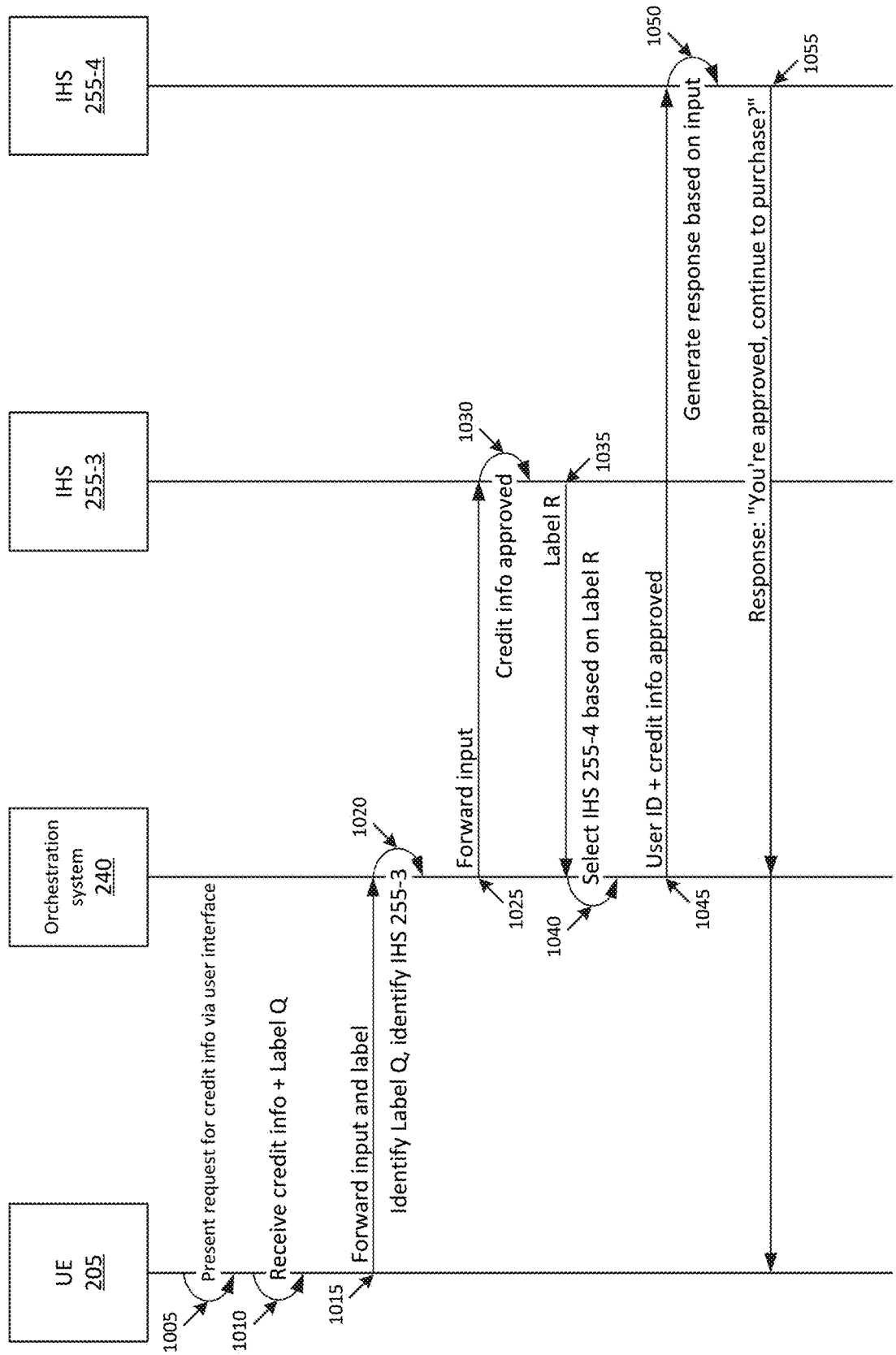

FIG. 10 illustrates another example signal flow in accordance with some embodiments. As shown, UE 205 may present (at 1005) a user interface that includes a request for credit information. In this example, the term "credit information" may refer to information that an entity may use to approve a credit application, such as identifying information, social security number, first and last name, address, or the like. UE 205 may receive (at 1010) the requested credit information via one or more interactive elements that are associated with example Label Q. UE 205 may forward (at 1015) the received input and the label to orchestration system 240.

Orchestration system 240 may identify (at 1020) Label Q, including identifying actions associated with Label Q. For instance, orchestration system 240 may identify that the input should be forwarded to input handling system 255-3. Orchestration system 240 may forward (at 1025) the received input to input handling system 255-3, which may handle the input in any suitable manner. In this example, input handling system 255-3 may determine (at 1030) that the credit information has been approved (e.g., a credit application for a user of UE 205), and may provide (at 1035) a response to orchestration system 240. The response may include a label (Label R in this example) and/or some other instruction to forward the approved credit information to another system (e.g., input handling system 255-4, in this example). Orchestration system 240 may identify the received Label R and may select (at 1040) input handling system 255-4 based on Label R (e.g., by determining that Label R is associated with an action indicating that information should be provided to input handling system 255-4).

Orchestration system 240 may forward (at 1045) the approval to input handling system 255-4, in accordance with the actions indicated by Label R. Label R may further indicate that orchestration system 240 should provide a user ID associated with UE 205 or a user of UE 205. In some embodiments, input handling system 255-3 may be a system associated with approving credit applications and/or handling sensitive information, and input handling system 255-4 may be a sales system associated with selling products and/or services to qualified customers. Input handling system 255-3 may be owned and/or operated by one entity (e.g., a company, division within a company, vendor, group, etc.), while input handling system 255-4 may be owned and/or operated by another entity (e.g., another company, another division within the same company, etc.). In some embodiments, input handling system 255-3 and input handling system 255-4 may be completely independent, in that there need not be any communication between the two systems in order for the process shown in FIG. 10 to be performed.

Input handling system 255-4 may generate (at 1050) a response based on the received information, such as a message asking if the user wishes to continue with a purchase process. This may be different than a response that would be generated if input handling system 255-4 is notified that the user has not been approved (e.g., may offer different set of products and/or services). Input handling system 255-4 may output (at 1055) the response to orchestration system 240, which may forward the response to UE 205 for presentation via a user interface of UE 205.

Figure 11:
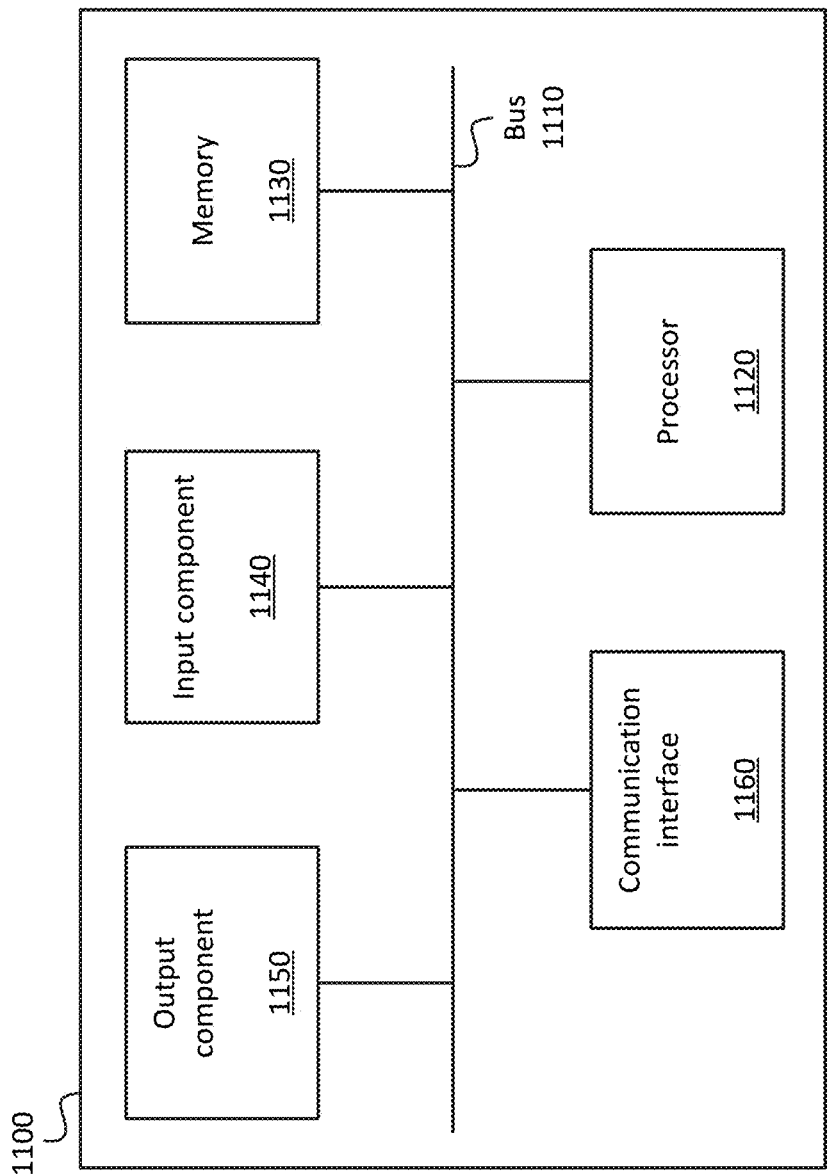
FIG. 11 illustrates example components of one or more devices, according to one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 7-10, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
present a graphical user interface ("GUI") that includes options to define a user interface for presentation at a User Equipment ("UE"), the GUI including a plurality of graphical elements that are selectable via drag and drop operations,
wherein a first set of the plurality of graphical elements of the GUI are associated with interactive elements that are available to be placed in the user interface, and
wherein a second set of the plurality of graphical elements of the GUI are associated with respective labels that are available to be associated with respective graphical elements, of the first set of graphical elements,
wherein a first label, associated with a first graphical element of the second set of graphical elements, is associated with a first set of actions, the first set of actions including an input validation action,
wherein a second label, associated with a second graphical element of the second set of graphical elements, is associated with a second set of actions,
wherein a combination of the first and second labels is associated with a third set of actions;
receive, via the GUI, a first drag and drop selection of a third graphical element, of the first set of graphical elements of the GUI, to associate a first interactive element with the user interface, wherein the first interactive element includes an option to receive a user input;
receive, via the GUI, a second selection to associate the first label with the first interactive element, the second selection including a second drag and drop selection of the first graphical element of the second set of graphical elements,
wherein the association of the first label with the first interactive element associates the first interactive element with an input validation action for user input received via the first interactive element;
receive, via the GUI, a third drag and drop selection of a fourth graphical element, of the first set of graphical elements of the GUI, to associate a second interactive element with the user interface;
receive, via the GUI, a fourth selection to associate the second label with the second interactive element, the fourth selection including a fourth drag and drop selection of the second graphical element of the second set of graphical elements;
receive, from the UE, a first user input that was received via the first interactive element of the user interface presented by the UE,
wherein the user interface includes a set of interactive elements, including the first interactive element and the second interactive element,
wherein each interactive element, of the set of interactive elements, is associated with a respective label;
identify, based on the receiving the first user input, which other interactive elements, of the set of interactive elements, have received user input;

identify, based on the receiving the first user input and based on which other interactive elements have received user input, that the first user input is associated with the first label that is associated with the first interactive element;

identify the first set of actions that is associated with the first label associated with the first interactive element via which the first user input was received, wherein identifying the first set of actions includes identifying user information from a user profile;

perform, based on identifying that the first user input is associated with the first label, the first set of actions, wherein performing the first set of actions includes:
performing the input validation action on the first user input received via the first interactive element after identifying the user information,
identifying a particular input handling system, from a plurality of input handling systems, that is associated with the first label, to perform additional actions of the first set of actions, and
forwarding the received user information and the first user input to the particular input handling system;

receive, from the UE, a second user input that was received via the first interactive element of the user interface presented by the UE and a third user input that was received via the second interactive element;

identify, based on identifying that the first interactive element has received the second user input and that the second interactive element has received the third user input, that the second user input is associated with the combination of the first and second labels;

identify, based on identifying that the third user input is associated with the combination of the first and second labels, that the third user input is associated with the third set of actions; and perform the third set of actions based on identifying that the second user input and the third user input have been received via the first and second interactive elements.

2. The device of claim 1, wherein the set of interactive elements include one or more graphical interactive elements.

3. The device of claim 1, wherein the set of interactive elements include one or more audible interactive elements.

4. The device of claim 1, wherein the second drag and drop selection of the first graphical element includes a placement of the first graphical element in a location of the GUI that is within a threshold distance of the first interactive element.

5. The device of claim 1, wherein executing the processor-executable instructions further causes the one or more processors to:
receive a response to the first user input, the response including a third label;
identify a fourth set of actions that is associated with the third label, the fourth set of actions being different from the first, second, and third sets of actions; and
perform the fourth set of actions associated with the third label.

6. The device of claim 1, wherein executing the processor-executable instructions, to identify the user information from the user profile, further causes the one or more processors to:
receive a user identifier or device identifier associated with the UE from which the first user input was received; and
output a request, to a user profile repository, for user information associated with the user identifier or the device identifier.

7. The device of claim 6, wherein performing the validation action further includes validating the first user input, received from the UE, against the user information, associated with the UE and received from the user profile repository, wherein executing the processor-executable instructions further causes the one or more processors to:
compare, after receiving the user information from the user profile repository, the first user input to the received user information; and
determine, based on the comparing, whether the first user input matches the received user information, wherein the validating is based on the determination of whether the first user input matches the received user information.

8. A non-transitory computer-readable medium, storing a set of processor-executable instructions, which, when executed by one or more processors, cause the one or more processors to:
present a graphical user interface ("GUI") that includes options to define a user interface for presentation at a User Equipment ("UE"), the GUI including a plurality of graphical elements that are selectable via drag and drop operations,
wherein a first set of the plurality of graphical elements of the GUI are associated with interactive elements that are available to be placed in the user interface, and
wherein a second set of the plurality of graphical elements of the GUI are associated with respective labels that are available to be associated with respective graphical elements, of the first set of graphical elements,
wherein a first label, associated with a first graphical element of the second set of graphical elements, is associated with a first set of actions, the first set of actions including an input validation action,
wherein a second label, associated with a second graphical element of the second set of graphical elements, is associated with a second set of actions,
wherein a combination of the first and second labels is associated with a third set of actions;
receive, via the GUI, a first drag and drop selection of a third graphical element, of the first set of graphical elements of the GUI, to associate a first interactive element with the user interface, wherein the first interactive element includes an option to receive a user input;
receive, via the GUI, a second selection to associate the first label with the first interactive element, the second selection including a second drag and drop selection of the first graphical element of the second set of graphical elements,
wherein the association of the first set label with the first interactive element associates the first interactive element with an input validation action for user input received via the first interactive element;
receive, via the GUI, a third drag and drop selection of a fourth graphical element, of the first set of graphical elements of the GUI, to associate a second interactive element with the user interface;
receive, via the GUI, a fourth selection to associate the second label with the second interactive element, the third selection including a fourth drag and drop selection of the second graphical element of the second set of graphical elements;
receive, from the UE, a first user input that was received via the first interactive element of the user interface presented by the UE,
    wherein the user interface includes a set of interactive elements, including the first interactive element and the second interactive element,
    wherein each interactive element, of the set of interactive elements, is associated with a label that is associated with a respective label;
identify, based on the receiving the first user input, which other interactive elements, of the set of interactive elements, have received user input;
identify, based on the receiving the first user input and based on which other interactive elements have received user input, that the first user input is associated with the first label that is associated with the first interactive element;
identify the first set of actions that is associated with the first label associated with the first interactive element via which the first user input was received, wherein identifying the first set of actions includes identifying user information from a user profile;
perform, based on identifying that the first user input is associated with the first label, the first set of actions, wherein performing the first set of actions includes:
    performing an input validation action for the first user input received via the first interactive element after identifying the user information,
    identifying a particular input handling system, from a plurality of input handling systems, that is associated with the first label, to perform additional actions of the first set of actions, and
    forwarding the received user information and the first user input to the particular input handling system;
receive, from the UE, a second user input that was received via the first interactive element of the user interface presented by the UE and a third user input that was received via the second interactive element;
identify, based on identifying that the first interactive element has received the second user input and that the second interactive element has received the third user input, that the second user input is associated with the combination of the first and second labels;
identify, based on identifying that the third user input is associated with the combination of the first and second labels, that the third user input is associated with the third set of actions; and
perform the third set of actions based on identifying that the second user input and the third user input have been received via the first and second interactive elements.

9. The non-transitory computer-readable medium of claim 8, wherein the set of interactive elements include one or more graphical interactive elements.

10. The non-transitory computer-readable medium of claim 8, wherein the set of interactive elements include one or more audible interactive elements.

11. The non-transitory computer-readable medium of claim 8, wherein the second drag and drop selection of the first graphical element includes a placement of the first graphical element in a location of the GUI that is within a threshold distance of the first interactive element.

12. The non-transitory computer-readable medium of claim 8, wherein the processor-executable instructions further include processor-executable instructions to:

receive a response to the first user input, the response including a third label;
identify a fourth set of actions that is associated with the third label, the fourth set of actions being different from the first, second, and third sets of actions; and
perform the fourth set of actions associated with the third label.

13. The non-transitory computer-readable medium of claim 8, wherein the processor-executable instructions, to identify the user information from the user profile, further include processor-executable instructions to:
receive a user identifier or device identifier associated with the UE from which the first user input was received; and
output a request, to a user profile repository, for user information associated with the user identifier or the device identifier.

14. The non-transitory computer-readable medium of claim 13, wherein performing the validation action further includes validating the first user input, received from the UE, against the user information, associated with the UE and received from the user profile repository, wherein executing the processor-executable instructions further causes the one or more processors to:
compare, after receiving the user information from the user profile repository, the first user input to the received user information; and
determine, based on the comparing, whether the first user input matches the received user information, wherein the validating is based on the determination of whether the first user input matches the received user information.

15. A method, comprising:
presenting a graphical user interface ("GUI") that includes options to define a user interface for presentation at a User Equipment ("UE"), the GUI including a plurality of graphical elements that are selectable via drag and drop operations,
    wherein a first set of the plurality of graphical elements of the GUI are associated with interactive elements that are available to be placed in the user interface, and
    wherein a second set of the plurality of graphical elements of the GUI are associated with respective labels that are available to be associated with respective graphical elements, of the first set of graphical elements,
    wherein a first label, associated with a first graphical element of the second set of graphical elements, is associated with a first set of actions, the first set of actions including an input validation action,
    wherein a second label, associated with a second graphical element of the second set of graphical elements, is associated with a second set of actions,
    wherein a combination of the first and second labels is associated with a third set of actions;
receiving, via the GUI, a first drag and drop selection of a third graphical element, of the first set of graphical elements of the GUI, to associate a first interactive element with the user interface, wherein the first interactive element includes an option to receive a user input;
receiving, via the GUI, a second selection to associate the first label with the first interactive element, the second selection including a second drag and drop selection of the first graphical element of the second set of graphical elements,
  wherein the association of the first label with the first interactive element associates the first interactive element with an input validation action for user input received via the first interactive element;
receiving, via the GUI, a third drag and drop selection of a fourth graphical element, of the first set of graphical elements of the GUI, to associate a second interactive element with the user interface;
receiving, via the GUI, a fourth selection to associate the second label with the second interactive element, the fourth selection including a fourth drag and drop selection of the second graphical element of the second set of graphical elements;
receiving, from the UE, a first user input that was received via the first interactive element of the user interface presented by the UE,
  wherein the user interface includes a set of interactive elements, including the first interactive element and the second interactive element,
  wherein each interactive element, of the set of interactive elements, is associated with a respective label;
identifying, based on the receiving the first user input, which other interactive elements, of the set of interactive elements, have received user input;
identifying, based on the receiving the first user input and based on which other interactive elements have received user input, that the first user input is associated with the first label that is associated with the first interactive element;
identifying the first set of actions that is associated with the first label associated with the first interactive element via which the first user input was received, wherein identifying the first set of actions includes identifying user information from a user profile;
performing, based on identifying that the first user input is associated with the first label, the first set of actions, wherein performing the first set of actions includes:
  performing an input validation action for the first user input received via the first interactive element after identifying the user information,
  identifying a particular input handling system, from a plurality of input handling systems, that is associated with the first label, to perform additional actions of the first set of actions, and
  forwarding the received user information and the first user input to the particular input handling system;
receiving, from the UE, a second user input that was received via the first interactive element of the user interface presented by the UE and a third user input that was received via the second interactive element;
identifying, based on identifying that the first interactive element has received the second user input and that the second interactive element has received the third user input, that the second user input is associated with the combination of the first and second labels;
identifying, based on identifying that the third user input is associated with the combination of the first and second labels, that the third user input is associated with the third set of actions; and
performing the third set of actions based on identifying that the second user input and the third user input have been received via the first and second interactive elements.

16. The method of claim 15, wherein the set of interactive elements include at least one of:
  one or more graphical interactive elements, or
  one or more audible interactive elements.

17. The method of claim 15, wherein the second drag and drop selection of the first graphical element includes a placement of the first graphical element in a location in the GUI that is within a threshold distance of the second interactive element.

18. The method of claim 15, wherein identifying, based on the receiving the first user input, which other interactive elements, of the set of interactive elements, have received user input, further includes identifying that the second interactive element has not received user input,
  wherein the first set of actions are selected based on receiving the first user input and further based on the identifying that the second interactive element has not received user input.

19. The method of claim 15, further comprising:
receiving a response to the first user input, the response including a third label;
identifying a fourth set of actions that is associated with the third label, the fourth set of actions being different from the first, second, and third sets of actions; and
performing the fourth set of actions associated with the third label.

20. The method of claim 15, further comprising:
receiving an identifier associated with the UE from which the first user input was received;
  wherein the first set of actions includes outputting a request, to a user profile repository, for user information associated with the identifier,
  wherein performing the validation action further includes validating the first user input, received from the UE, against the user information received from the user profile repository;
comparing, after receiving the user information from the user profile repository, the first user input to the received user information; and
determining, based on the comparing, whether the first user input matches the received user information, wherein the validating is based on the determination of whether the first user input matches the received user information.

* * * * *